United States Patent
Shkir et al.

(10) Patent No.: US 12,030,787 B2
(45) Date of Patent: Jul. 9, 2024

(54) PROCESS FOR SYNTHESIZING RARE EARTH-DOPED COBALT-CHROMITE PIGMENTS FOR CAPACITIVE AND RESISTIVE HUMIDITY SENSOR APPLICATIONS

(71) Applicants: Princess Nourah bint Abdurahman University, Riyadh (IN); Mohd. Shkir, Abha (SA)

(72) Inventors: Mohd. Shkir, Abha (SA); Thamraa Alshahrani, Riyadh (SA); Anuj Kumar, Mathura (IN); S. AlFaify, Abha (SA); Mohd Ubaidullah, Riyadh (SA); N. Senthilkumar, Clement Town Dehradun (IN); Jagadeesha Angadi. V, Hubballi (IN)

(73) Assignees: Mohd. Shkir, Abha (SA); Princess Nourah bint Abdurahman University, Riyadh (SA)

( * ) Notice: Subject to any disclaimer, the term of this patent is extended or adjusted under 35 U.S.C. 154(b) by 0 days.

(21) Appl. No.: 18/309,371

(22) Filed: Apr. 28, 2023

(65) Prior Publication Data
US 2023/0357047 A1 Nov. 9, 2023

(51) Int. Cl.
*C01G 51/00* (2006.01)
*G01N 27/12* (2006.01)
(Continued)

(52) U.S. Cl.
CPC ........... *C01G 51/40* (2013.01); *G01N 27/121* (2013.01); *G01N 27/223* (2013.01); *H01B 1/08* (2013.01);
(Continued)

(58) Field of Classification Search
CPC ............. H01B 1/00; H01B 1/08; C01G 51/40
See application file for complete search history.

(56) References Cited

U.S. PATENT DOCUMENTS

| 4,086,556 A * | 4/1978 | Nitta | G01N 27/121 252/521.2 |
| 6,284,033 B1 * | 9/2001 | Chopin | C09C 1/04 106/480 |

OTHER PUBLICATIONS

Mohanty et al "Effect of Ce3+ substitution at B site on magnetic phase transitions in CoCr2O4 nanoparticles", Dec. 2022 Conf: SAIP 2022 At: Nelson Mandela University.*

(Continued)

*Primary Examiner* — Mark Kopec
(74) *Attorney, Agent, or Firm* — Perilla Knox & Hildebrandt LLP; Kenneth A. Knox

(57) ABSTRACT

The present invention generally relates to a process for synthesizing rare earth-doped cobalt-chromite ($CoCr_{2-x}R_xO_4$) pigments for capacitive and resistive humidity sensor applications, the process includes of crushing individually metal nitrates and rare earth material (R) using a hydraulic press to form a powder of metal nitrates and rare earth nitrates; dissolving the powder of metal nitrates and rare earth material (R) with fuels in 30 milliliters of distilled water with constant stirring using a magnetic stirrer to form a green color solution; heating the green color solution at 425 degrees Celsius for half an hour to obtain a green powder; extracting and grinding the green powder in an agate mortar for 1 hour to form a fine green pigment; and annealing the fine green pigment in a muffle furnace for two hours at a temperature of 500-600 degrees to remove organic residue and obtain rare earth-doped cobalt-chromite ($CoCr_{2-x}R_xO_4$) pigments.

15 Claims, 12 Drawing Sheets

---

100

102 — Crushing individually metal nitrates and rare earth material (R) using a hydraulic press to form a powder of metal nitrates and rare earth nitrates 104 — Dissolving the powder of metal nitrates and rare earth material (R) with fuels in 30 milliliters of distilled water with constant stirring using a magnetic stirrer to form a green color solution 106 — Heating the green color solution at 425 degrees Celsius for half an hour to obtain a green powder 108 — Extracting and grinding the green powder in an agate mortar for 1 hour to form a fine green pigment 110 — Annealing the fine green pigment in a muffle furnace for two hours at a temperature of 500-600 degrees to remove organic residue and obtain rare earth-doped cobalt-chromite ($CoCr_{2-x}R_xO_4$) pigments

(51) Int. Cl.
*G01N 27/22* (2006.01)
*H01B 1/08* (2006.01)

(52) U.S. Cl.
CPC ...... *C01P 2002/54* (2013.01); *C01P 2002/72* (2013.01); *C01P 2004/02* (2013.01); *C01P 2004/32* (2013.01); *C01P 2006/16* (2013.01); *C01P 2006/40* (2013.01); *C01P 2006/60* (2013.01)

(56) References Cited

OTHER PUBLICATIONS

Ramprasad et al "Synthesis and Study of Highly Porous Nature Gadolinium Doped CoCr2O4: Focus on the Structural, Microstructural, Electric, and Humidity Sensing Properties", ISSN 1061-3862, International Journal of Self-Propagating High-Temperature Synthesis, 2022, vol. 31, No. 4, pp. 169-178.*

Manjunatha et al "Structural, electronic and magnetic properties of Sc3+ doped CoCr2O4 nanoparticles", New J. Chem., 2020, 44, 14246.*

Mustafa et al "Investigation of structural and magnetic properties of Ce3+-substituted nanosized Co—Cr ferrites for a variety of applications", Journal of Alloys and Compounds 618 (2015) 428-436.*

Miranda et al "Green Inorganic Pigment Production with Spinel Structure CoCr2O4 by Solution Combustion Synthesis", Tecciencia, vol. 14 No. 26, 37-42, 2019.*

* cited by examiner

PROCESS FOR SYNTHESIZING RARE EARTH-DOPED COBALT-CHROMITE PIGMENTS FOR CAPACITIVE AND RESISTIVE HUMIDITY SENSOR APPLICATIONS

FIELD OF THE INVENTION

The present disclosure relates to a process for synthesizing rare earth-doped cobalt-chromite pigments for capacitive and resistive humidity sensor applications.

BACKGROUND OF THE INVENTION

It is essential to have humidity sensors in order to accurately measure and control the amount of humidity that is present in a wide variety of industries and medical settings, such as those dealing with the storage of food, the production of paper and textiles, incubators, respiratory equipment, and the processing of pharmaceuticals. Extensive research is now being conducted on a wide range of materials, including organic semiconductors, metal oxides, composites, and ceramics, with the end goal of effectively fabricating humidity sensors out of these many types of substances. Rare earth doped $CoCr_2O_4$ green pigments with an extremely porous nature powder were produced using a quick and affordable chemical synthesis procedure called solution combustion. X-ray diffraction analyses revealed the phase composition and average crystallite size. SEM images of the samples that had been annealed at 600 degrees revealed the existence of cuboids and soft agglomerations. Using an LCR meter to analyze the dielectric properties of as-synthesized samples, it is discovered that the small crystallite size exhibits a higher dielectric constant. The results were impressive when permittivity and electrical resistivity fluctuated with frequency under humid circumstances. By varying the relative humidity from 0 to 100%, electrical measurements were performed to investigate the rare earth pigments' capabilities for sensing humidity. Sample electrical resistance decreases over the entire humidity range. At room temperature, the resistive responses were measured at various relative humidity (RH) levels ranging from 0% to 98% and at various frequencies ranging from 20 Hz to 20 MHz. The rare earth doped green pigments used in the humidity sensor have a linear response, high sensitivity, and low hysteresis. In addition, the sensor has 35 and 240 second reaction and recovery times, respectively. Our research indicates that this material could be employed as a capacitive and resistive humidity sensor. The results of this work open the door for the use of rare earth doped cobalt chromate pigments in applications for humidity sensing.

The Capacitive and resistive properties of rare earth Sm doped $CoCr_2O_4$ can be used in humidity sensors due to the low sintering temperature, low manufacturing cost, and good response time excellent relative humidity and sensing behaviour can be used in humidity sensors applications It is essential to have humidity sensors in order to accurately measure and control the amount of humidity that is present in a wide variety of industries and medical settings, such as those dealing with the storage of food, the production of paper and textiles, incubators, respiratory equipment, and the processing of pharmaceuticals. Extensive research is now being conducted on a wide range of materials, including organic semiconductors, metal oxides, composites, and ceramics, with the end goal of effectively fabricating humidity sensors out of these many types of substances. Rare earth doped Cobalt chromate materials have recently attracted a lot of attention as potential materials due to the fact that they are both cost effective and flexible. These materials have been successfully incorporated into a variety of devices, including solar cells, electroluminescent devices, chemical sensors, and ultraviolet sensors.

Green Pigments containing rare earth dopants that are cobalt chromate green show significant potential as candidates due to their good physical properties, strong chemical and thermal endurance, and excellent electron conjugation inside the macrocycles. This gives them a lot of room for improvement. Thin films of nanomaterial compounds have been employed as sensing materials in the use of gas sensors, which allows for the detection of a wide variety of different gaseous species. These gaseous species consist of $NO_2$, HCl, and volatile organic compounds. Additionally, these gaseous species have been utilized in the production of humidity sensors. There has not yet been any research done on the use of capacitive and resistive humidity sensors that involve rare earth doped $CoCr_2O_4$. As a direct consequence of this fact, the purpose of this work is to carry out an analysis of a resistive type humidity sensor that is based on rare earth doped $CoCr_2O_4$.

In the view of the forgoing discussion, it is clearly portrayed that there is a need to have a scalable and eco-friendly capacitive and resistive material of rare earth doped $CoCr_2O_4$ for humidity sensors due to the low sintering temperature, low manufacturing cost, and good response time excellent relative humidity and sensing behaviour can be used in humidity sensors applications.

SUMMARY OF THE INVENTION

The present disclosure seeks to provide a process for capacitive and resistive material of rare earth doped $CoCr_2O_4$ for humidity sensors.

In an embodiment, the process includes crushing individually metal nitrates and rare earth material (R) using a hydraulic press to form a powder of metal nitrates and rare earth nitrates.

In another embodiment, the process includes dissolving the powder of metal nitrates and rare earth material (R) with fuels in 30 milliliters of distilled water with constant stirring using a magnetic stirrer to form a green color solution.

In another embodiment, the process includes heating the green color solution at 425 degrees Celsius for half an hour to obtain a green powder.

In another embodiment, the process includes extracting and grinding the green powder in an agate mortar for 1 hour to form a fine green pigment.

In another embodiment, the process includes annealing the fine green pigment in a muffle furnace for two hours at a temperature of 500-600 degrees to remove organic residue and obtain rare earth-doped cobalt-chromite ($CoCr_{2-x}R_xO_4$) pigments.

In another embodiment, metal nitrates and rare earth nitrates are crushed using the hydraulic press at a pressure of 5 tones.

In another embodiment, metal nitrates are selected from Cobalt nitrate and chromium nitrate.

In another embodiment, at step 110, a process of annealing the fine green pigment includes of annealing the fine green pigment by heating to a predetermined temperature of 500-600° C. to cause recrystallization pigments; annealing the recrystallized pigments at a temperature of 500-600° C. to provide a grain structure having a lamellar spacing of 20 µm or more in the annealed recrystallized pigments, and heating the pigments during decarburization annealing in a heating process consisting of only induction heating at a heating rate of 40° C./s or more in a temperature range of 550° C. to 600° C.

In another embodiment, the process includes of incorporating oxide compounds to an elevated temperature in between 500 and 1000 degrees Celsius in reaction for forming the rare earth-doped cobalt-chromite ($CoCr_{2-x}R_xO_4$) pigments, wherein an amount of oxygen is being incorporated in the rare earth-doped cobalt-chromite ($CoCr_{2-x}R_xO_4$) pigments.

In another embodiment, the process includes of doping rare earth material in metal nitrates through at least one of vapor-phase doping and solution doping; and sintering the doped rare earth material to form a mixture solution of the rare earth material with metal nitrates.

In another embodiment, the process includes of combining the rare-earth element-based solution with an appropriate nitrate solution to form a desired rare earth-nitrate slurry; adding a base to the rare earth-nitrate slurry; isolating the quantum dot pigment from the slurry; and heat-treating the isolated quantum dot pigment.

In another embodiment, the process includes of spheroidizing the slurry containing a rare earth element to which an activator is added by a spray drying method.

In another embodiment, the rare earth-doped $CoCr_2O_4$ pigments having a doping level of 0.05.

In another embodiment, at step 106, heating the green color solution includes of conducting heating conducted at a temperature of 425° C. in an atmosphere of argon, nitrogen, or argon or nitrogen containing up to 20% by volume of hydrogen.

In another embodiment, the process includes of dehydrating the rare earth-doped cobalt-chromite ($CoCr_{2-x}R_xO_4$) pigments by drying or baking, and then heating to 600° C. to 1600° C. for clean, dry and fresh rare earth-doped cobalt-chromite ($CoCr_{2-x}R_xO_4$) pigments.

In another embodiment, the green powder is placed in the agate mortar and put through a grinding process when the particles are completely dry, wherein the grinding process lasted one hour and resulted in the production of the fine green pigment.

In another embodiment, the porous rare earth materials are selected from Sm, Gd, Ho and Ce, wherein the porous rare earth-doped $CoCr_{2-x}R_xO_4$ is synthesized through a simple chemical synthesis method i.e. solution combustion method using a mixture of urea and glucose.

In another embodiment, pore size of the nitrates material is in range of 15 to 20 nm, wherein pore size of the $CoCr_{2-x}R_xO_4$ pellets is in range of 11 nm to 100 nm.

In another embodiment, response time and recovery time of the rare earth doped $CoCr_{2-x}R_xO_4$ is 110 to 140 seconds and 150 to 250 seconds, respectively.

In another embodiment, a rare earth-doped cobalt-chromite ($CoCr_{2-x}R_xO_4$) pigment for capacitive and resistive humidity sensor applications, said pigments includes 7 gms of metal nitrates; 0.2 gms of rare earth material (R); 1-10 milliliters of fuels; and 30 milliliters of distilled water.

In another embodiment, the rare earth material (R) is selected from Sm, Gd, Ho and Ce.

In another embodiment, rare earth-doped $CoCr_{2-x}R_xO_4$ pigments samples with a doping level (x) of 0.05.

In another embodiment, the fuels are selected from urea and glucose.

In another embodiment, metal nitrates are selected from Cobalt nitrate and chromium nitrate.

An object of the present disclosure is to develop capacitive and resistive material of rare earth doped $CoCr_2O_4$ for humidity sensors.

Another object of the present disclosure is to monitor the levels of ambient humidity.

Yet another object of the present invention is to deliver an expeditious and cost-effective process for capacitive and resistive material of rare earth doped $CoCr_2O_4$ for humidity sensors.

To further clarify advantages and features of the present disclosure, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF FIGURES

These and other features, aspects, and advantages of the present disclosure will become better understood when the following detailed description is read with reference to the accompanying drawings in which like characters represent like parts throughout the drawings, wherein.

Figure 1:
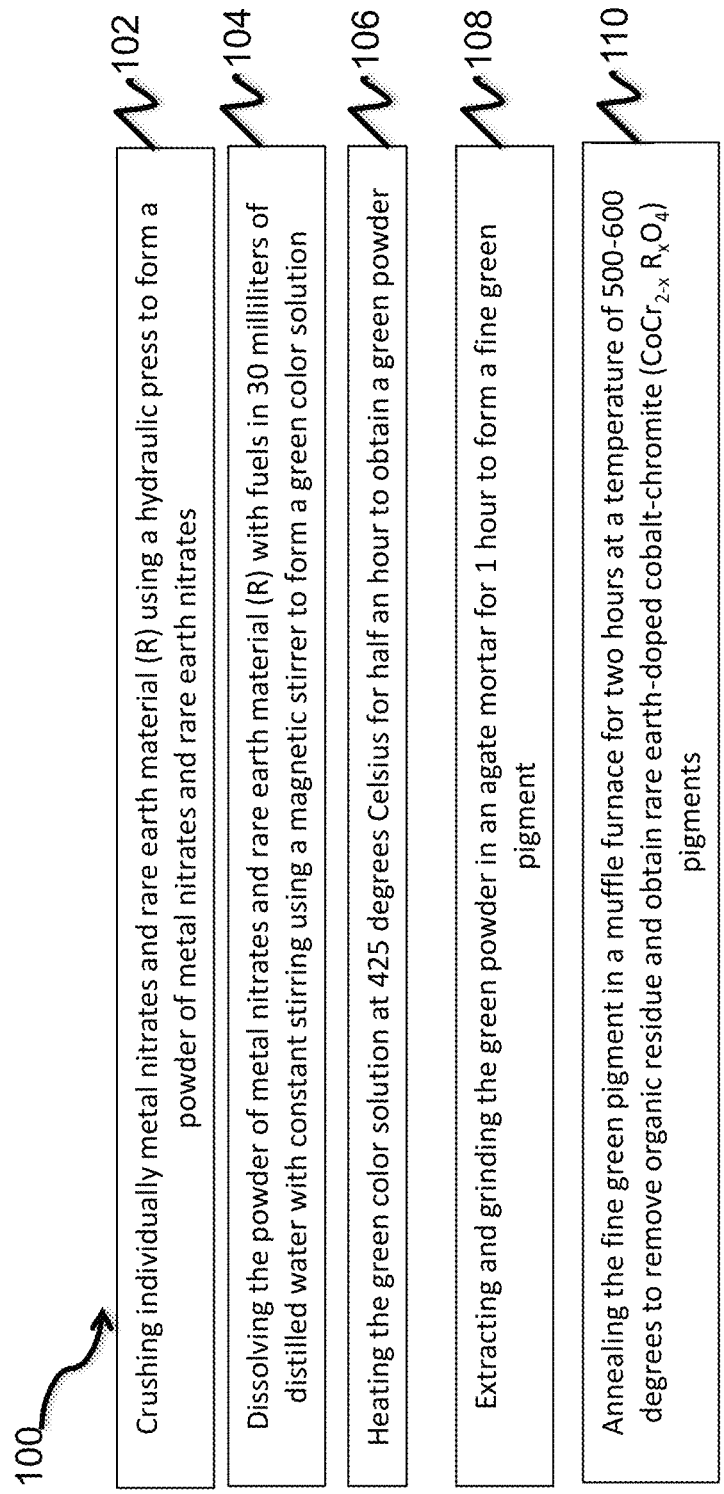
FIG. 1 illustrates a flow chart of a process for capacitive and resistive material of rare earth doped $CoCr_2O_4$ for humidity sensors in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present disclosure will be described below in detail with reference to the accompanying drawings.

Referring to FIG. 1, a flow chart of process for synthesizing rare earth-doped cobalt-chromite ($CoCr_{2-x}R_xO_4$) pigments for capacitive and resistive humidity sensor applications is illustrated in accordance with an embodiment of the present disclosure. At step 102, process 100 includes crushing individually metal nitrates and rare earth material (R) using a hydraulic press to form a powder of metal nitrates and rare earth nitrates.

At step 104, process 100 includes dissolving the powder of metal nitrates and rare earth material (R) with fuels in 30 milliliters of distilled water with constant stirring using a magnetic stirrer to form a green color solution.

At step 106, process 100 includes heating the green color solution at 425 degrees Celsius for half an hour to obtain a green powder.

At step 108, process 100 includes extracting and grinding the green powder in an agate mortar for 1 hour to form a fine green pigment.

At step 110, process 100 includes annealing the fine green pigment in a muffle furnace for two hours at a temperature of 500-600 degrees to remove organic residue and obtain rare earth-doped cobalt-chromite ($CoCr_{2-x}R_xO_4$) pigments.

In an embodiment, metal nitrates and rare earth nitrates are crushed using the hydraulic press at a pressure of 5 tones.

In another embodiment, metal nitrates are selected from Cobalt nitrate and chromium nitrate.

In another embodiment, at step 110, a process of annealing the fine green pigment includes of annealing the fine green pigment by heating to a predetermined temperature of 500-600° C. to cause recrystallization pigments; annealing the recrystallized pigments at a temperature of 500-600° C. to provide a grain structure having a lamellar spacing of 20 μm or more in the annealed recrystallized pigments, and heating the pigments during decarburization annealing in a heating process consisting of only induction heating at a heating rate of 40° C./s or more in a temperature range of 550° C. to 600° C.

In another embodiment, the process includes of incorporating oxide compounds to an elevated temperature in between 500 and 1000 degrees Celsius in reaction for forming the rare earth-doped cobalt-chromite ($CoCr_{2-x}R_xO_4$) pigments, wherein an amount of oxygen is being incorporated in the rare earth-doped cobalt-chromite ($CoCr_{2-x}R_xO_4$) pigments.

In another embodiment, the process includes of doping rare earth material in metal nitrates through at least one of vapor-phase doping and solution doping; and sintering the doped rare earth material to form a mixture solution of the rare earth material with metal nitrates.

In another embodiment, the process includes of combining the rare-earth element-based solution with an appropriate nitrate solution to form a desired rare earth-nitrate slurry; adding a base to the rare earth-nitrate slurry; isolating the quantum dot pigment from the slurry; and heat-treating the isolated quantum dot pigment.

In another embodiment, the process includes of spheroidizing the slurry containing a rare earth element to which an activator is added by a spray drying method.

In another embodiment, the rare earth-doped $CoCr_2O_4$ pigments having a doping level of 0.05.

In another embodiment, at step 106, heating the green color solution includes of conducting heating conducted at a temperature of 425° C. in an atmosphere of argon, nitrogen, or argon or nitrogen containing up to 20% by volume of hydrogen.

In another embodiment, the process includes of dehydrating the rare and then heating to 600° C. to 1600° C. for clean, dry and fresh rare earth-doped cobalt-chromite ($CoCr_{2-x}R_xO_4$) pigments.

In another embodiment, the green powder is placed in the agate mortar and put through a grinding process when the particles are completely dry, wherein the grinding process lasted one hour and resulted in the production of the fine green pigment.

In another embodiment, the porous rare earth materials are selected from Sm, Gd, Ho and Ce, wherein the porous rare earth-doped $CoCr_{2-x}R_xO_4$ is synthesized through a simple chemical synthesis method i.e. solution combustion method using a mixture of urea and glucose.

In another embodiment, pore size of the nitrates material is in range of 15 to 20 nm, wherein pore size of the $CoCr_{2-x}R_xO_4$ pellets is in range of 11 nm to 100 nm.

In another embodiment, response time and recovery time of the rare earth doped $CoCr_{2-x}R_xO_4$ is 110 to 140 seconds and 150 to 250 seconds, respectively.

In another embodiment, a rare earth-doped cobalt-chromite ($CoCr_{2-x}R_xO_4$) pigment for capacitive and resistive humidity sensor applications, said pigments includes 7 gms of metal nitrates; 0.2 gms of rare earth material (R); 1-10 milliliters of fuels; and 30 milliliters of distilled water.

In another embodiment, the rare earth material (R) is selected from Sm, Gd, Ho and Ce.

In another embodiment, rare earth-doped $CoCr_{2-x}R_xO_4$ pigments samples with a doping level (x) of 0.05.

In another embodiment, the fuels are selected from urea and glucose.

In another embodiment, metal nitrates are selected from Cobalt nitrate and chromium nitrate.

Synthesis of Rare Earth (R=Ce, Gd, Ho and Sm) Doped $CoCr_2O_4$

An efficient and cost-effective method of chemical synthesis known as solution combustion is utilized in the production of rare earth-doped $CoCr_2O_4$ pigments samples with a doping level of 0.05. Stoichiometry dictated that the beginning materials—metal nitrates, rare earth nitrates, and fuels—should be dissolved in 30 milliliters of distilled water with constant stirring until the solution became totally dissolved and developed a green color. After the processes had been dissolved entirely, the solution is heated to 425 degrees Celsius and held there for half an hour. This is done to finish the formation reaction and obtain a green powder in the form of ash. This powder is then removed and thoroughly ground with mortar. When the particles are completely dry, they are placed in an agate mortar and put through a grinding process that lasted one hour and resulted in the production of a fine green pigment. In order to remove any organic residue, the samples are annealed in a muffle furnace for two hours at a temperature of 600 degrees.

Figure 2:
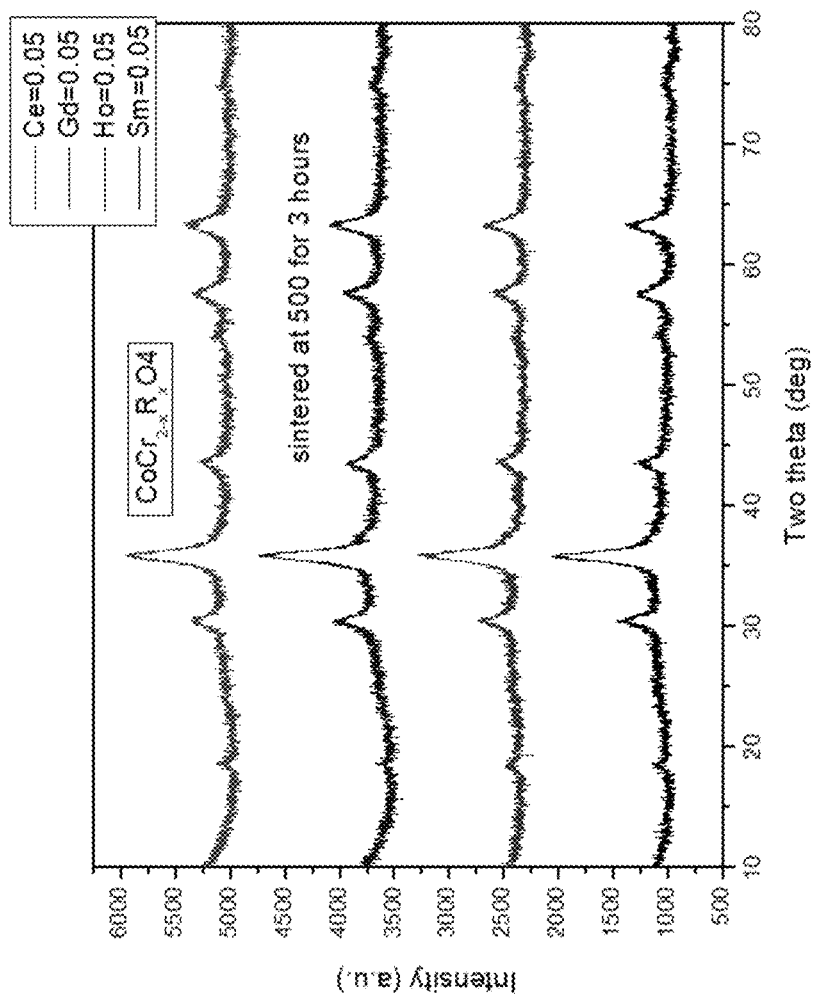
FIG. 2 illustrates a XRD pattern of rare earth (R=Ce, Gd, Ho and Sm) doped $CoCr_2O_4$ in accordance with an embodiment of the present disclosure.

FIG. 2 illustrates a XRD pattern of rare earth (R=Ce, Gd, Ho and Sm) doped $CoCr_2O_4$ in accordance with an embodiment of the present disclosure. XRD analysis is utilised to determine the crystal phase structures of the re rare earth doped ($CoCr_2O_4$, and these structures are depicted in FIG. 2. In the case of samples exhibits single phase spinel cubic structure and its well matched for standard JCPDS no. 89-4924 and $CoCr_2O_4$, it is possible to index all of the diffraction peaks to the cubic spinel phase JCPDS no. 01-1122. Using the XRD pattern and Debye and Scherrer's equation, the crystallite sizes of the samples are determined. As the rare earth changes sample size decreases and found less than 20 nm crystallite size.

Figure 3:
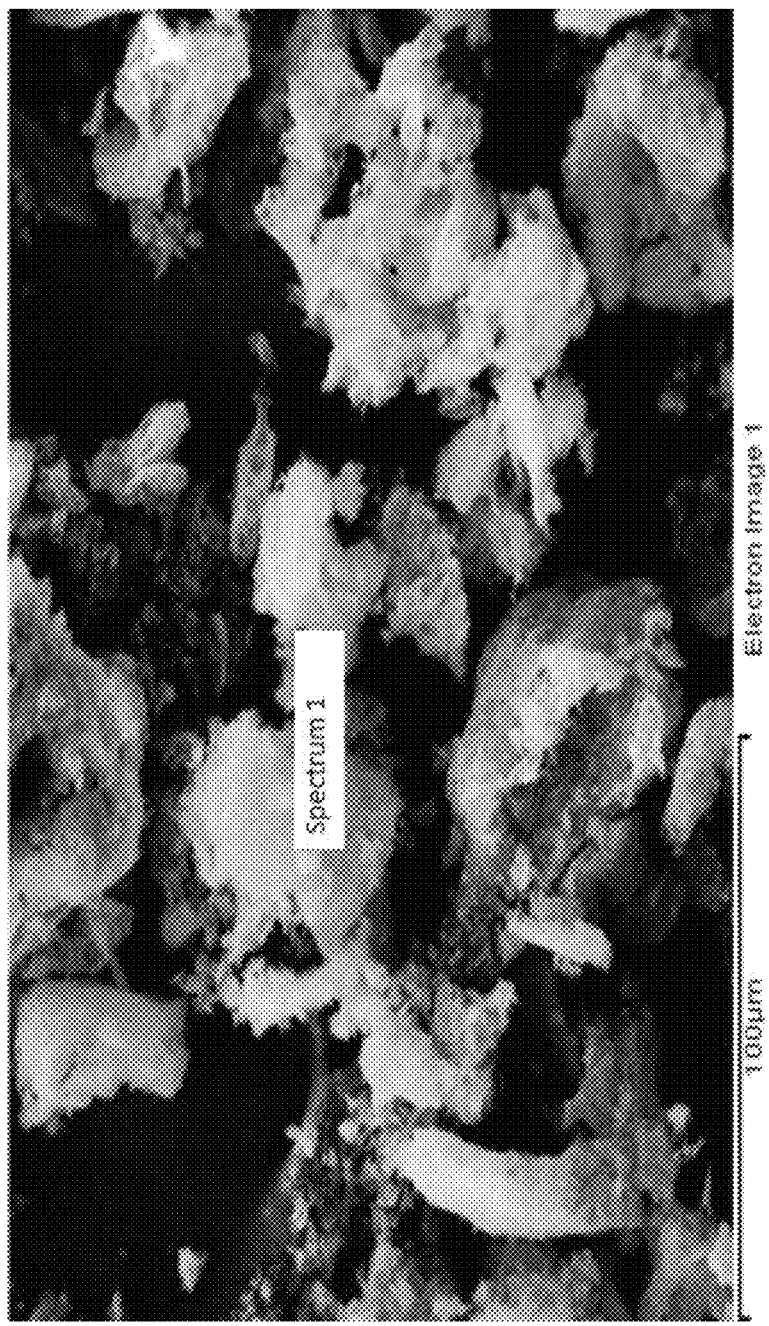
FIG. 3 illustrates a microstructure of $CoCr_{1.95}Sm_{0.05}O_4$ in accordance with an embodiment of the present disclosure.

FIG. 3 illustrates a microstructure of $CoCr_{1.95}Sm_{0.05}O_4$ in accordance with an embodiment of the present disclosure. The FESEM image of rare earth doped $CoCr_2O_4$ that specifies that the synthesized chromate pigments are homogenous, spherical and highly porous nature. These characteristics of the samples helps to increase the humidity-sensing behavior.

Figure 4:
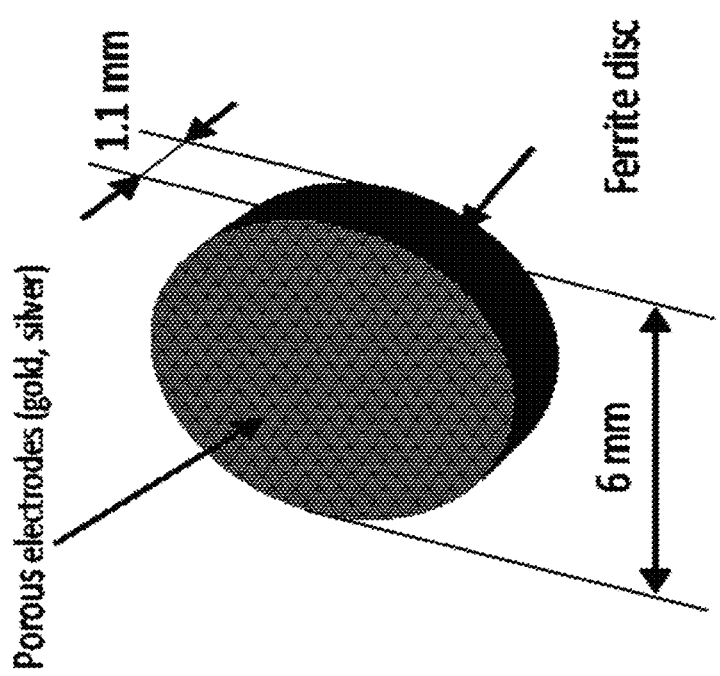
FIG. 4 illustrates a capacitive and resistive humidity sensor measurement setup in accordance with an embodiment of the present disclosure.
Figure 4:
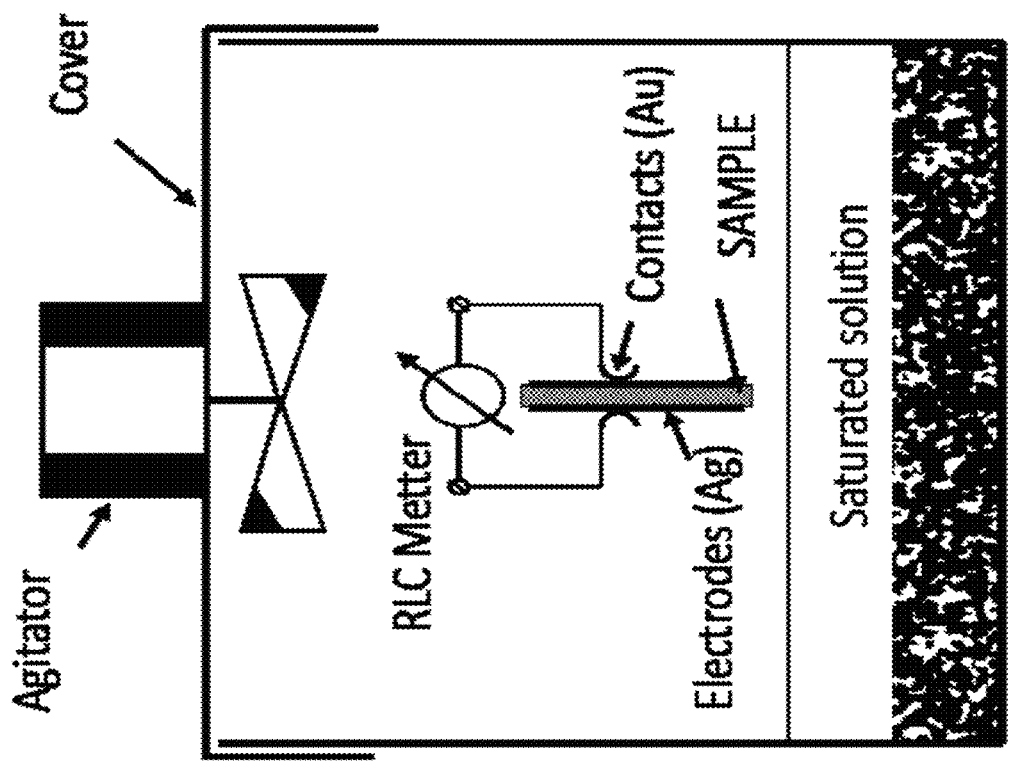

FIG. 4 illustrates a capacitive and resistive humidity sensor measurement setup in accordance with an embodiment of the present disclosure. Painting porous palladium-silver electrodes onto both sides of the disk-shaped samples served as the basis for the creation of the humidity sensors. When subjected to varying rare earth concentration, a variety of resistive and capacitive humidity sensors are tested for their levels of sensitivity. The following are the expressions that are used to determine the sensitivity of the humidity sensors:

SC it is sensibility capacitive coefficient and SR it is sensibility resistive coefficient.

$$SR=((Ro-R)/Ro) \times 100$$

$$SC=((C-Co)/C) \times 100$$

where SR or SC is resistive or capacitive sensors sensitivity expressed as a percentage.

Figure 5A:
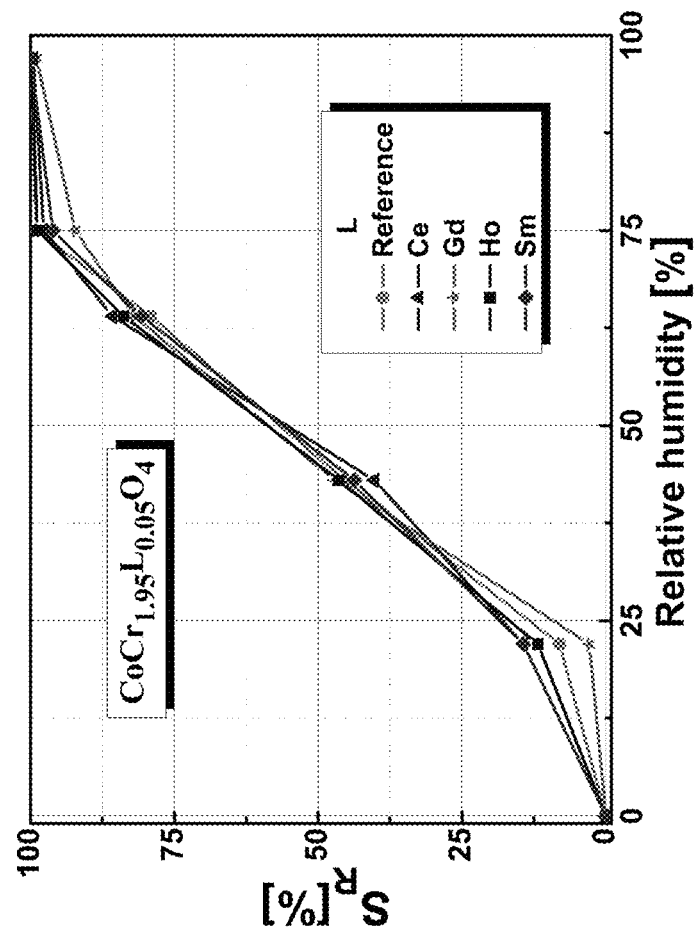
FIGS. 5A and 5B illustrate sensitivities of rare earth doped $CoCr_2O_4$ material for resistive and capacitive sensors in accordance with an embodiment of the present disclosure.
Figure 5B:
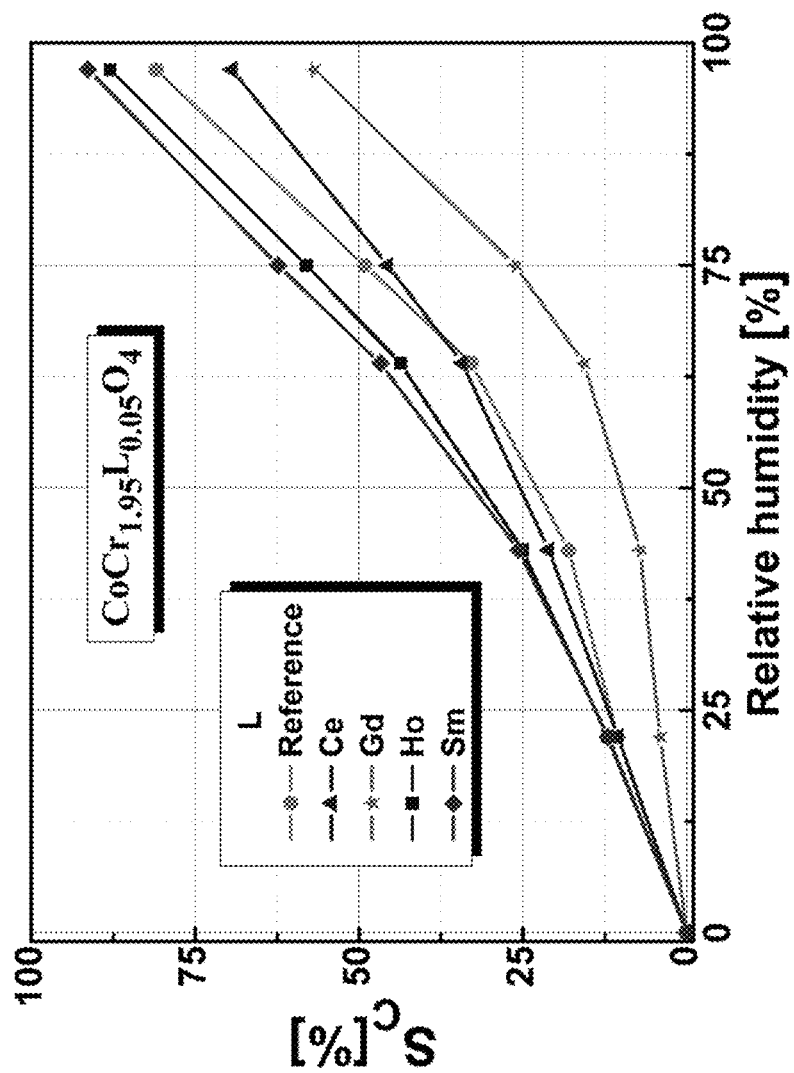

FIGS. 5A and 5B illustrate sensitivities of rare earth doped $CoCr_2O_4$ material for resistive and capacitive sensors in accordance with an embodiment of the present disclosure. It is possible to determine the effect that humidity has on electrical properties by housing the sensor parts in chambers whose temperatures are controlled and whose relative humidity ranged from 0% to 100%. By gradually increasing the relative humidity from 0% RH to 100% RH, the amount of time required for a response is calculated. The sensitivities of rare earth doped $CoCr_2O_4$ material for resistive and capacitive sensors are depicted in FIG. 5A-5B. These sensitivities depend on the relative humidity in the air.

The rare earth (Sm) doped $CoCr_2O_4$ material gives humidity sensors a significant increase in their sensitivity, as demonstrated in FIG. 3. The great sensitivity can be explained by the way in which Sm doped $CoCr_2O_4$ electrical characteristics can be changed through the pores and on the surface of the material. This result is generated by the vast number of open pores, a fact which demonstrates an essential function in the absorption of water vapors. It has been discovered that the sensitivity to humidity is strong across the area of relative humidity. Additionally, the evaluations have indicated that the sensors have a short time of response but a long time of recovery. Because of this, the humidity sensors based on this material are appropriate for use in warning systems. The Sm doped $CoCr_2O_4$ material has the ability to be utilized as a humidity sensor that is specialized in the monitoring of a variety of processes due to its high sensitivity to humidity and its thermal durability when compare to other rare earth doped $CoCr_2O_4$ green pigments.

Figure 6A:
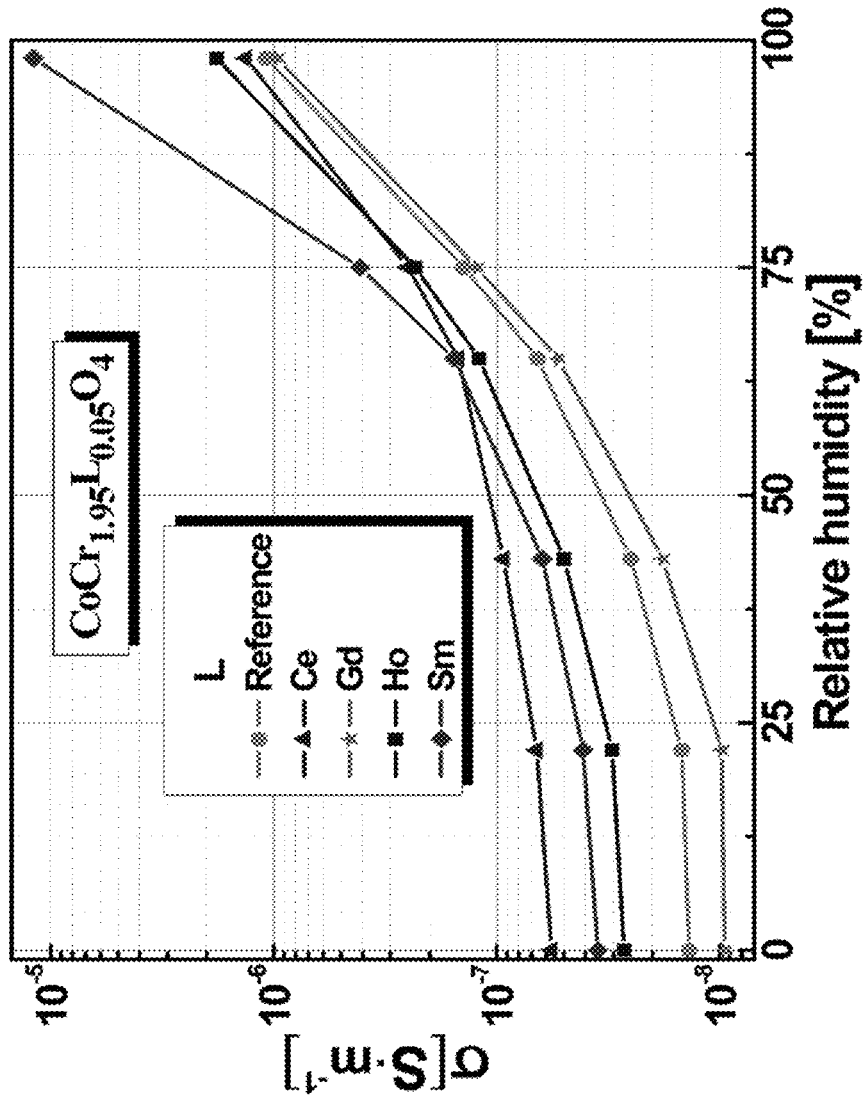
FIG. 6A illustrates electrical conductivity response to changes in relative humidity of rare earth (R=Ce, Gd, Ho and Sm) doped $CoCr_2O_4$
Figure 6B:
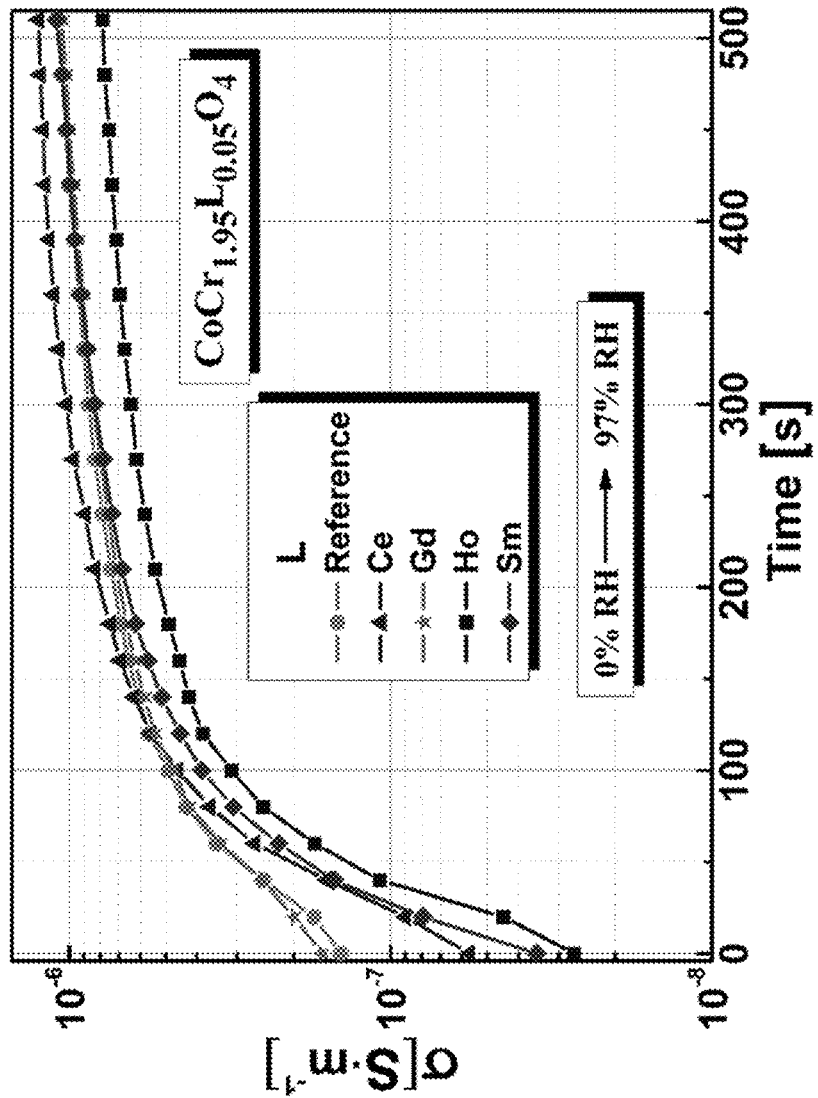
FIG. 6B illustrates electrical conductivity response with time of rare earth (R=Ce, Gd, Ho and Sm) doped $CoCr_2O_4$ in accordance with an embodiment of the present disclosure.

FIG. 6A illustrates electrical conductivity response to changes in relative humidity of rare earth (R=Ce, Gd, Ho and Sm) doped $CoCr_2O_4$ and FIG. 6B presents electrical conductivity response with time of rare earth (R=Ce, Gd, Ho and Sm) doped $CoCr_2O_4$ in accordance with an embodiment of the present disclosure. A hydraulic press is used to crush each of the different types of rare earth doped powder in order to analyze the effect that humidity had on the electrical properties. The porous silver electrodes are placed on both sides of the disk-samples that had a diameter of 6 millimeters and a thickness of approximately 1 millimeter as shown in the humidity sensing measurement setup.

FIG. 6, which consists of two graphs, provides a graphical representation of the relationship that exists between the electrical conductivity and the relative humidity. Electrical conductivity is said to be highly dependent on the level of relative humidity, with conductivity increasing by approximately one order of magnitude with increasing relative humidity from 0% RH to 98% RH. This is based on the observation that electrical conductivity increases with increasing relative humidity. The electrical conductivity is increases with different rare earth content in the presence of relative humidity and it is high for Sm doped $Cocr_2O_4$ green pigments.

The graphical representation that is provided in FIG. 6A demonstrates that the significant change in electrical conductivity that occurs in response to changes in relative humidity occurs over the course of a period of time that is approximately three minutes and fifty seconds long.

Figure 7:
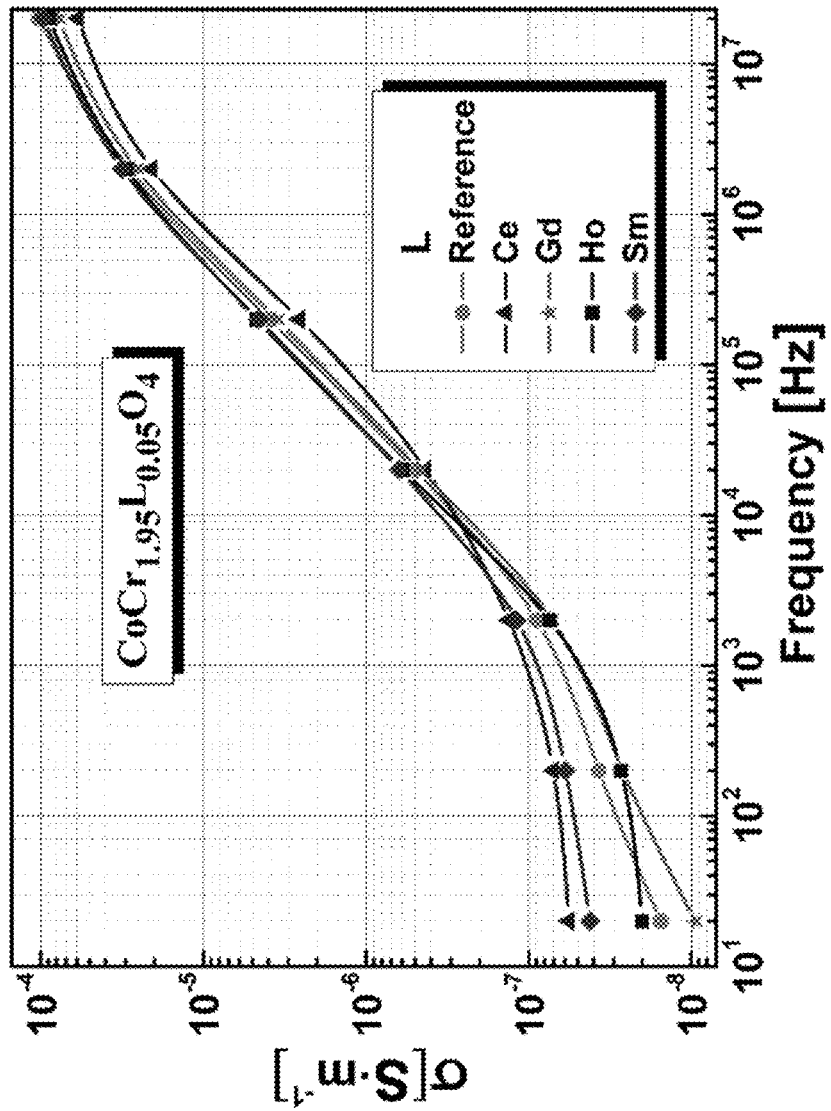
FIG. 7 illustrates the link between frequency and electrical conductivity for rare earth (R=Ce, Gd, Ho and Sm) doped $CoCr_2O_4$ in accordance with an embodiment of the present disclosure.

FIG. 7 illustrates the link between frequency and electrical conductivity for rare earth (R=Ce, Gd, Ho and Sm) doped $CoCr_2O_4$ in accordance with an embodiment of the present disclosure. FIG. 7 illustrates the link between frequency and electrical conductivity. This figure also illustrates the effect that temperature has on the electrical conductivity of rare earth doped $CoCr_2O_4$.

A change in the electrical conductivity value that is equivalent to two orders of magnitude is caused by the range of relative humidity that goes from 11 percent to 98 percent. After 350 seconds have passed, the electrical conductivity of the samples begins to fluctuate less, which results in the graph becoming flatter.

The frequency dependent conductivity as shown in FIG. 7, the different rare earth has a substantial effect on the electrical conductivity of the substance. Therefore, the electrical conductivity increases by an order of magnitude depending on the rare earth and it is exhibits high for Sm doped $CoCr_2O_4$. Inhomogeneous grain and grain-boundary effects, in conjunction with crystalline regions, both of which create variable relaxation durations for microscopic dipoles, are the causes of this phenomenon. These distinct periods of relaxation time are mirrored in distinct frequency responses, each of which corresponds to a relaxation process that is unique to the type of spinel $CoCr_2O_4$. The inhomogeneous grain and grain-boundary effects are responsible for the shift in the slope of the electrical conductivity curve that occurs at high frequencies in comparison to those that occur at low frequencies. revealed data that are similar to one another in terms of the AC conductivity. The improvement in electrical conductivity can be attributed to a wide variety of various factors.

To begin, as the different rare earth is doping, the samples go through a process that results in them becoming denser and, consequently, more conductive. Second, as the samples are heated to $Sm^{3+}$, the quantity of chromium that is contained within them reduces, which results in the samples being more conductive.

Figure 8:
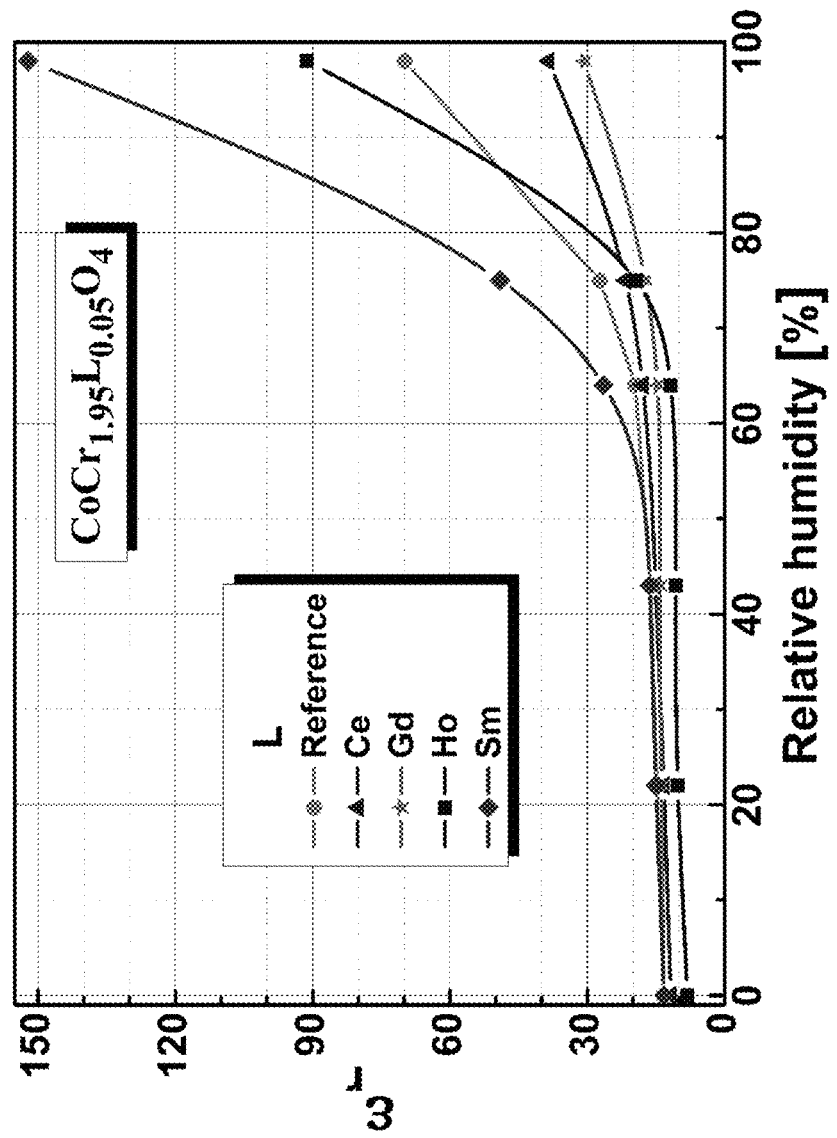
FIG. 8 illustrates electrical response of the rare earth doped $CoCr_2O_4$ with the influence relative humidity ranging from 0% to 98% for rare earth (R=Ce, Gd, Ho and Sm) doped $CoCr_2O_4$ in accordance with an embodiment of the present disclosure.

FIG. 8 illustrates electrical response of the rare earth doped $CoCr_2O_4$ with the influence relative humidity ranging from 0% to 98% for rare earth (R=Ce, Gd, Ho and Sm) doped $CoCr_2O_4$ in accordance with an embodiment of the present disclosure. It is vital to properly monitor the levels of ambient humidity and to take into consideration the repercussions of this element. Humidity is a key factor that influences the environment and, implicitly, the proper operation of electronic components and a variety of other pieces of equipment. In addition, the relative permittivity and electrical conductivity of the copper-zinc ferrites are subjected to a battery of experiments to evaluate how sensitive they are to shifts in the relative humidity. The results of these tests are presented in the next paragraph (RH).

The electrical response of the rare earth doped $CoCr_2O_4$ is tested under the influence of humidity in a test chamber in which relative humidity ranging from 0% to 98% is obtained using some saturated salt solutions at a constant temperature of 25° C. and presented in FIG. 8. The results of the test showed that humidity had a greater effect on the electrical response of the Sm-doped $CoCr_2O_4$ The experiments are conducted at the same temperature throughout their entirety. The characteristics of the electric permittivity shift brought about by the relative humidity are illustrated in FIG. 7 for rare earth doped $CoCr_2O_4$ with different rare earth. These qualities are illustrated in a number of different guises all throughout the picture. When the different rare earth is raised one may detect an increase in the electrical relative permittivity of the material. This leads to an increase that is roughly one order of magnitude greater than before.

When the levels of relative humidity are low, there is a more significant increase in the samples' relative permittivity. According to this conclusion, the samples have a higher degree of sensitivity when the relative humidity levels are low.

Figure 9:
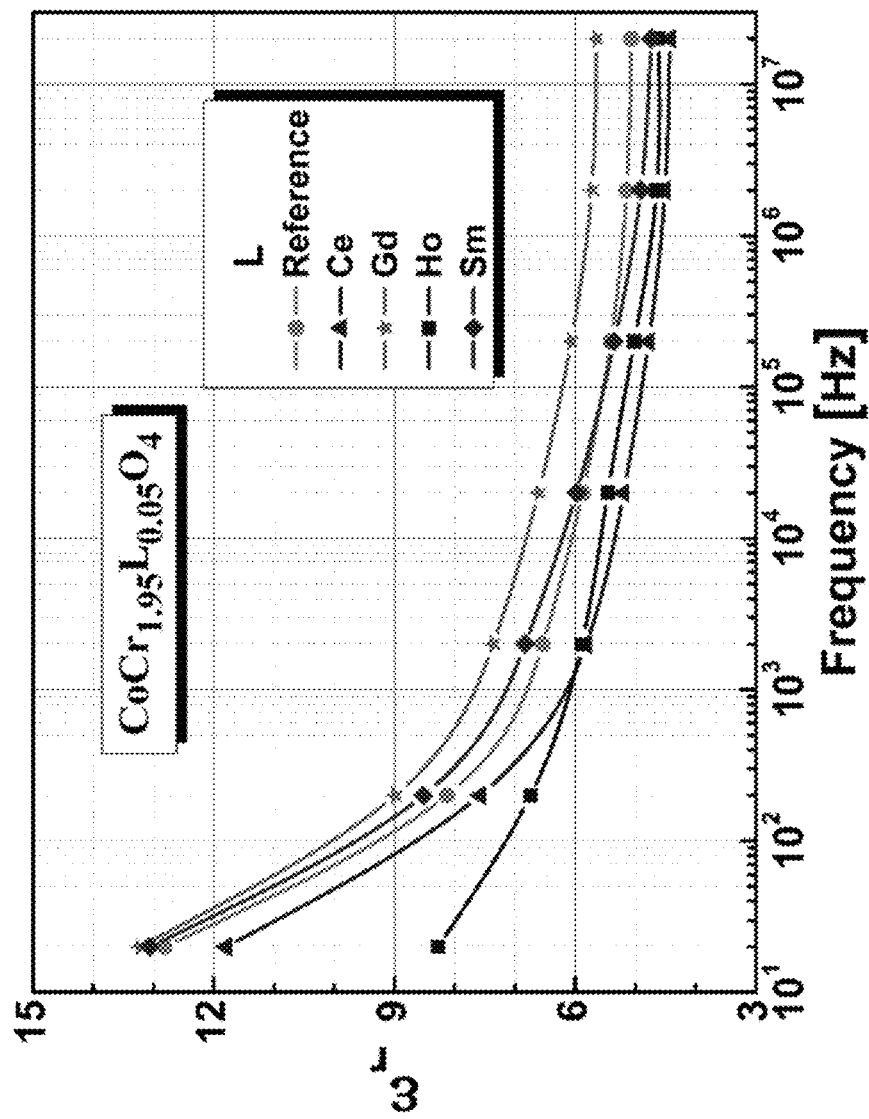
FIG. 9 illustrates permittivity over the frequency range of 20 Hz to 2 MHz of the Rare earth (R=Ce, Gd, Ho and Sm) doped $CoCr_2O_4$ in accordance with an embodiment of the present disclosure.

FIG. 9 illustrates permittivity over the frequency range of 20 Hz to 2 MHz of the Rare earth (R=Ce, Gd, Ho and Sm) doped $CoCr_2O_4$ in accordance with an embodiment of the present disclosure. In order to conduct electrical research, samples with different rare earth dopant are polished to a diameter of 6 millimeters and a thickness of 1 millimeter. Porous silver electrodes are then placed on both of the samples' flat surfaces after the samples had been polished. Additionally, the frequency dependence of the electrical permittivity and conductivity is researched because it is important for determining the conduction mechanism in the samples. This is done because it is found that $CoCr_2O_4$ has this frequency dependency. The relative change in the electrical permittivity over the frequency range of 20 Hz to 2 MHz is shown in FIG. 9. These studies are carried out at room temperature (T=25° C.) with the assumption that a parallel RC equivalent circuit is present. This circuit consisted of electrical capacity in parallel with resistance ferrite losses.

As a result, it has been found that the rare earth doped $CoCr_2O_4$ in addition to the frequency, has a significant impact on the relative electrical permittivity. This can be understood by taking into account the fact that rare earth rises, and the grain size of the $CoCr_2O_4$ increases. In the frequency range of 20 Hz to 2 MHz, all of the samples show a relative permittivity drop that is approximately two or three orders of magnitude smaller than the initial value. This is illustrated in FIG. 8.

Figure 10:
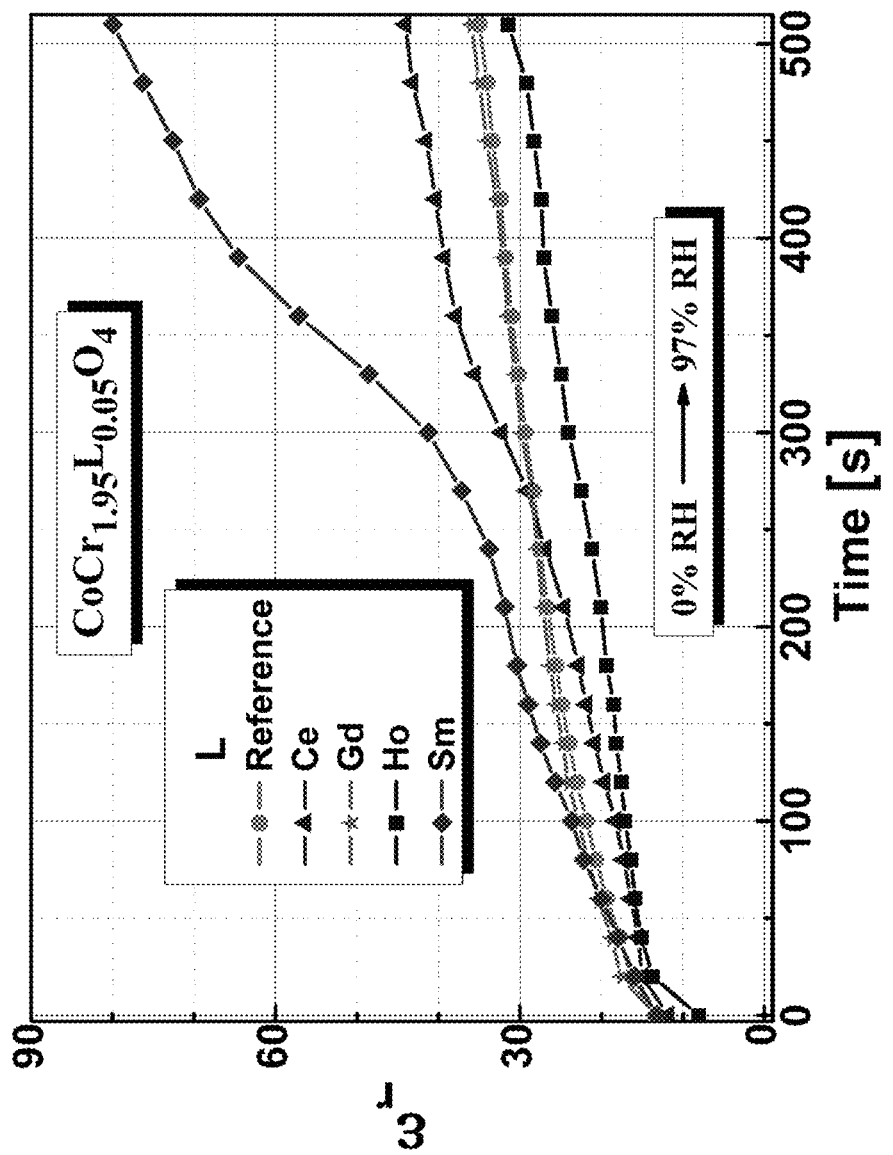
FIG. 10 illustrates relative permittivity of time intervals for rare earth (R=Ce, Gd, Ho and Sm) doped $CoCr_2O_4$ in accordance with an embodiment of the present disclosure.

FIG. 10 illustrates relative permittivity of time intervals for rare earth (R=Ce, Gd, Ho and Sm) doped $CoCr_2O_4$ in accordance with an embodiment of the present disclosure. This large reduction in relative permittivity that occurs with rare earth content can be attributed to the growth in crystallite size, which in turn leads to a reduction in the number of oxygen vacancies. Other authors have reported values for the electric permittivity that are comparable to those presented here. As can be seen in FIG. 8, in the frequency range of 20 Hz to 2 kHz, a strong frequency dependence of the sample treated at 850° C. is found. Within this frequency range, a dramatic drop in relative permittivity from a value is found. This drop in relative permittivity can be seen in FIG. 9, which is a graphical representation of the data, reveals that there is a significant variation of the relative permittivity (a higher tilt) in approximately 300 seconds for all of the samples that fall within the humidity range of 11% to 98% RH. This variation occurs in all of the samples. Simply glancing at the figure should be enough to make one aware of this fact. It has been observed that there is a smaller shift in the relative permittivity over the course of time intervals that are longer than 300 seconds (smaller tilt). When the sintering temperature is increased, the average size of the crystallites increases, which, in turn, results in a reduction in both the sensitivity to humidity and the response time of the material (FIG. 10).

The method according to claim 1 wherein said an efficient and cost-effective preparation of highly porous rare earth (Sm, Gd, Ho and Ce) doped $CoCr_2O_4$ simple chemical synthesis method i. e solution combustion method using a mixture of urea and glucose. Stoichiometry dictated that the beginning materials—metal nitrates, rare earth nitrates, and fuels—should be dissolved in 30 milliliters of distilled water with constant stirring until the solution became totally dissolved and developed a green color. After the processes had been dissolved entirely, the solution is heated to 425 degrees Celsius and held there for half an hour. This is done to finish the formation reaction and obtain a green powder in the form of ash. This powder is then removed and thoroughly ground with mortar. When the particles are completely dry, they are placed in an agate mortar and put through a grinding process that lasted one hour and resulted in the production of a fine green pigment. In order to remove any organic residue, the samples are annealed in a muffle furnace for two hours at a temperature of 500 or 600 degrees.

The size of the material is in the range of 15 to 20 nm. The pore size of the porous rare earth doped $CoCr_2O_4$ pellets is in the range of 11 nm to 100 nm. The defined quantity of the ground mixture is compressed under pressure in a hydraulic press to achieve palletization. Where in the resistance value of the samples is stable relative humidity. The response time and recovery time of the rare earth doped $CoCr_2O_4$ is 110 to 140 seconds and 150 to 250 seconds, respectively. For porous materials, the electrical characteristics of the samples are studied by looking at the effects of relative humidity dynamics on electrical resistivity and capacity responses. Humidity sensitivity is measured in controlled environments with a known relative humidity and a constant temperature of 25 degrees Celsius. Changing the relative humidity from 0% RH to 100% RH and then back again is used to calculate the response and recovery periods, respectively. There is a predicable notable response to changing of humidity conditions for both resistive and capacitive components. Among all the rare earth Sm doped $CoCr_2O_4$ exhibits excellent resistive and capacitive sensing behavior. These materials are profitable materials for humidity sensors.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

The invention claimed is:

1. A process for synthesizing rare earth-doped cobalt-chromite pigments for capacitive and resistive humidity sensor applications, the process comprises:

crushing metal nitrates and rare earth material (R) using a hydraulic press to form a powder of both metal nitrates and rare earth nitrates;

dissolving the powder of metal nitrates and rare earth material (R) with fuels in 30 milliliters of distilled water with constant stirring using a magnetic stirrer to form a green color solution;

heating the green color solution at 425 degrees Celsius for half an hour to obtain a green powder;

extracting and grinding the green powder in an agate mortar for 1 hour to form a fine green pigment; and annealing the fine green pigment in a muffle furnace for two hours at a temperature of 500-600 degrees to remove organic residue and obtain rare earth-doped cobalt-chromite pigments.

2. The process of claim 1, wherein metal nitrates and rare earth nitrates are crushed using the hydraulic press at a pressure of 5 tones.

3. The process of claim 1, wherein metal nitrates are selected from Cobalt nitrate and chromium nitrate.

4. The process of claim 1, wherein annealing the fine green pigment comprises:

annealing the fine green pigment by heating to a predetermined temperature of 500-600° C. to cause recrystallization pigments;

annealing the recrystallized pigments at a temperature of 500-600° C. to provide a grain structure having a lamellar spacing of 20 μm or more in the annealed recrystallized pigments, and heating the pigments during decarburization annealing in a heating process consisting of only induction heating at a heating rate of 40° C./s or more in a temperature range of 550° C. to 600° C.

5. The process of claim 1, further comprising incorporating oxide compounds to an elevated temperature in between 500 and 1000 degrees Celsius in reaction for forming the rare earth-doped cobalt-chromite pigments, wherein an amount of oxygen is being incorporated in the rare earth-doped cobalt-chromite pigments.

6. The process of claim 1, further comprising doping rare earth material in metal nitrates through at least one of vapor-phase doping and solution doping; and sintering the doped rare earth material to form a mixture solution of the rare earth material with metal nitrates.

7. The process of claim 6, further comprising: combining the rare-earth element-based solution with an appropriate nitrate solution to form a desired rare earth-nitrate slurry; adding a base to the rare earth-nitrate slurry; isolating the quantum dot pigment from the slurry; and heat-treating the isolated quantum dot pigment.

8. The process of claim 7, further comprising of spheroidizing the slurry containing a rare earth element to which an activator is added by a spray drying method.

9. The process of claim 6, wherein the rare earth-doped CoCr2O4 pigments having a doping level of 0.05.

10. The process of claim 1, heating the green color solution includes of conducting heating conducted at a temperature of 425° C. in an atmosphere of argon, nitrogen, or argon or nitrogen containing up to 20% by volume of hydrogen.

11. The process of claim 1, further comprising of dehydrating the rare earth-doped cobalt-chromite pigments by drying or baking, and then heating to 600° C. to 1600° C. for clean, dry and fresh rare earth-doped cobalt-chromite pigments.

12. The process of claim 1, wherein the green powder is placed in the agate mortar and put through a grinding process when the particles are completely dry, wherein the grinding process lasted one hour and resulted in the production of the fine green pigment.

13. The process of claim 1, wherein the porous rare earth materials are selected from Sm, Gd, Ho and Ce, wherein the porous rare earth-doped cobalt-chromite is synthesized through a solution combustion method using a mixture of urea and glucose.

14. The process of claim 1, wherein pore size of the nitrates material is in range of 15 to 20 nm, wherein pore size of the rare earth-doped cobalt-chromite pellets is in range of 11 nm to 100 nm.

15. The process of claim 1, wherein response time and recovery time of the rare earth-doped cobalt-chromite is 110 to 140 seconds and 150 to 250 seconds, respectively.

* * * * *